United States Patent Office 3,414,512
Patented Dec. 3, 1968

3,414,512
METHOD OF FLOCCULATING SOLIDS
Tegner A. Johnson, Grand Rapids, Minn., assignor to United States Steel Corporation, a corporation of Delaware
No Drawing. Filed Nov. 30, 1966, Ser. No. 597,898
2 Claims. (Cl. 210—51)

ABSTRACT OF THE DISCLOSURE

Many ore concentrating processes involve the use of large quantities of water. Before such water can be re-used in the process or drained into streams or lakes, it may be necessary to settle out suspended solids. A common flocculating agent for hastening settling of the solids is a combination of caustic soda and starch. This flocculent is ineffective when used in surface drainage water from certain sources. The present invention provides a method of overcoming this difficulty by adding a combination of reagents to the water. The reagents are magnesium sulfate, manganese sulfate, and calcium hydroxide. The caustic starch flocculent becomes effective when used in surface drainage water which has been treated with these additional reagents.

SPECIFICATION

This invention relates to an improved method of flocculating solids suspended in water.

My flocculating method is especially applicable to slimes or tailings which remain suspended in water after an ore concentrating operation, particularly iron ore. Before such water can be re-used or even drained into streams or lakes, it is usually necessary to settle out most of the suspended solids. Numerous flocculating agents are known for hastening the settling. One such agent which has been used successfully is a "caustic starch", a combination of starch and sodium hydroxide. However, caustic starch is ineffective as a flocculent when used with surface drainage water from certain sources, for example the St. Louis River in Minnesota. I am not fully aware of the explanation for its ineffectiveness in these waters, but I believe it is due to the presence of impurities, such as organic matter, oxygen or acidity-controlling salts, in trace amounts.

An object of my invention is to provide an improved flocculating method in which I use a caustic starch flocculent effectively with surface drainage water.

A more specific object is to provide a flocculating method in which $MgSO_4$, $MnSO_4$ and $Ca(OH)_2$ are added to surface drainage water to counteract the flocculation-inhibiting effect, whereby a caustic-starch flocculent becomes effective.

According to my invention, I add to surface drainage water a combination of reagents as follows:

| Reagent | Pounds per 1,000 gallons | |
|---|---|---|
|  | Minimum | Maximum |
| $MgSO_4 \cdot 7H_2O$ | 1.0 | 5.0 |
| $MnSO_4 \cdot H_2O$ | 0.5 | 1.5 |
| $Ca(OH)_2$ | 0.05 | 0.20 |

The optimum quantity of each reagent varies with the nature of the solids to be flocculated and the source of the water. I add these reagents to the water before introducing a caustic starch flocculent. Commonly the flocculent is prepared by making a starch paste with water, adding the paste and sodium hydroxide to water held at 70° C., and diluting the resulting solution to a concentration of about 0.50 percent by weight starch and 0.25 percent by weight NaOH. The flocculent is added to a suspension of solids in a quantity to provide about 0.3 to 1.0 pounds starch per long ton of suspended solids or preferably about 0.5 pounds. With my reagent combination added to surface drainage water, the flocculent becomes effective in the same proportions as in other water where there is no problem. Once I have added the reagents, I need not add them again as the water is re-used. In fact about 20 percent new surface water can be tolerated without greatly affecting flocculation.

As a specific example to demonstrate the effectiveness of my invention, I prepared slurries of three different samples of tailings which I obtained from a magnetic taconite beneficiation operation. I used water from the St. Louis River. In each instance I added a caustic starch flocculent to the slurry in a quantity to provide 0.50 pound of starch and 0.25 pound NaOH per long ton of solids. In the first three tests I added no reagent other than the caustic starch flocculent. In the next three before adding the caustic starch, I added reagents as follows per 1000 gallons of water:

| | Lbs. |
|---|---|
| $MgSO_4 \cdot 7H_2O$ | 4.23 |
| $MnSO_4 \cdot H_2O$ | 1.47 |
| $Ca(OH)_2$ | 0.16 |

In the final three I recirculated water from the second three, making new slurry and adding caustic starch, but no more of the reagents. In each instance I agitated the slurry and allowed it to settle five minutes. The results were as follows:

| Fine tails sample | Condition of supernantant | Settling rate, feet per | Suspended parts per million | pH of supernatant |
|---|---|---|---|---|
| *No treatment—control tests* | | | | |
| A | Opaque | (¹) | 441 | 8.00 |
| B | do | (¹) | 979 | 8.30 |
| C | do | (¹) | 968 | 8.30 |
| *Reagents added as described above* | | | | |
| A | Translucent | 69.4 | 64 | 8.15 |
| B | do | 75.6 | 120 | 8.30 |
| C | do | 90.5 | 92 | 8.30 |
| *Treatment of recycle water, 100%* | | | | |
| A | Translucent | 72.4 | 62 | 8.00 |
| B | do | 82.8 | 115 | 8.00 |
| C | do | 107.5 | 92 | 8.30 |

¹ Indefinite.

The acceptable limit in treated water is about 150 parts per million of solids. As the foregoing table shows, the samples treated with my combination of reagents produced supernatant liquid with a solids content well below this limit. The first three samples showed no measurables settling rate, and the solids content was much too high.

While I have described only certain preferred ways of practicing my invention, it is apparent modifications may arise. Therefore I do not wish to be limited by the disclosure set forth, but only by the scope of the appended claims.

I claim:
1. A method of flocculating solids suspended in surface drainage water comprising adding to the water a combination of reagents which comprises: $MgSO_4 \cdot 7H_2O$ in a range of from 1.0 to 5.0 pounds per 1000 gallons of water, $MnSO_4 \cdot H_2O$ in a range of from 0.5 to 1.5 pounds per 1000 gallons of water and $Ca(OH)_2$ in a range of from 0.05 to 0.20 pounds per 1000 gallons of water and introducing to the water a caustic starch flocculent in a quantity to provide about 0.3 to 1.0 pounds of starch per long ton of suspended solids.

2. A method as defined in claim 1 in which the solids are tailings from a magnetic taconite concentrating operation.

References Cited

UNITED STATES PATENTS 2,980,608   4/1961   Johnson _____ 210—52

FOREIGN PATENTS 19,379     1899     Great Britain.
481,499    3/1938   Great Britain.
530,946    12/1940  Great Britain.

MICHAEL E. ROGERS, *Primary Examiner.*

UNITED STATES PATENT OFFICE
CERTIFICATE OF CORRECTION

Patent No. 3,414,512  December 3, 1968

Tegner A. Johnson

It is certified that error appears in the above identified patent and that said Letters Patent are hereby corrected as shown below:

Column 2, line 30, after "Suspended" insert -- solids --; line 31, after "per" insert -- hr. --.

Signed and sealed this 10th day of March 1970.

(SEAL)
Attest:

Edward M. Fletcher, Jr.  WILLIAM E. SCHUYLER, JR.
Attesting Officer  Commissioner of Patents